United States Patent
Nakagawa et al.

(10) Patent No.: US 6,358,646 B1
(45) Date of Patent: Mar. 19, 2002

(54) METHOD OF MAKING A FLAT TYPE LITHIUM SECONDARY BATTERY AND ELECTRODE

(75) Inventors: Hiroe Nakagawa; Kazuya Okabe; Koji Itoh; Takashi Itoh; Seijiro Ochiai; Syuichi Izuchi, all of Takatsuki (JP)

(73) Assignee: Yuasa Corporation, Takatsuki (JP)

( * ) Notice: Subject to any disclaimer, the term of this patent is extended or adjusted under 35 U.S.C. 154(b) by 0 days.

(21) Appl. No.: 09/381,918

(22) PCT Filed: Jan. 25, 1999

(86) PCT No.: PCT/JP99/00263

§ 371 Date: Sep. 27, 1999

§ 102(e) Date: Sep. 27, 1999

(87) PCT Pub. No.: WO99/38225

PCT Pub. Date: Jul. 29, 1999

(30) Foreign Application Priority Data

Jan. 27, 1998 (JP) .............................. 10-13864
Sep. 29, 1998 (JP) ............................ 10-275196

(51) Int. Cl.⁷ ............................ H01M 4/04; H01M 4/60
(52) U.S. Cl. ..................................... 429/212; 29/623.5
(58) Field of Search ................................. 429/163, 216, 429/236, 212; 29/623.5

(56) References Cited

U.S. PATENT DOCUMENTS

| | | | | |
|---|---|---|---|---|
| 5,582,935 A | * | 12/1996 | Dasgupta | 429/218 |
| 5,654,112 A | * | 8/1997 | Itou | 429/192 |
| 5,698,147 A | * | 12/1997 | Chern | 264/104 |
| 5,749,927 A | * | 5/1998 | Chern | 29/623.5 |
| 5,772,934 A | * | 6/1998 | MacFadden | 264/42 |

FOREIGN PATENT DOCUMENTS

| | | | | |
|---|---|---|---|---|
| JP | 7-272759 | 10/1995 | | |
| JP | 7-326383 | 12/1995 | | |
| JP | 409050802 A | * | 2/1997 | H01M/4/04 |
| JP | WO99/38255 | 7/1999 | | |

* cited by examiner

Primary Examiner—Gabrielle Brouillette
Assistant Examiner—Mark Ruthkosky
(74) Attorney, Agent, or Firm—Crowell & Moring LLP

(57) ABSTRACT

A film-type lithium secondary battery, in which an electrolyte layer (13) composed only of an electrolyte integrated with an electrolyte in a cathode composite (11) is formed on a surface of the cathode composite (11) of a positive electrode (1), an electrolyte layer (23) composed only of an electrolyte integrated with an electrolyte in an anode composite (21) is formed on a surface of the anode composite (21) of a negative electrode (2), and the positive electrode (1) is opposed against the negative electrode (2) through the electrolyte layers (13 & 23).

12 Claims, 4 Drawing Sheets

METHOD OF MAKING A FLAT TYPE LITHIUM SECONDARY BATTERY AND ELECTRODE

This application is a 371 of PCT/JP99/00263, filed Jan. 25, 1999.

TECHNICAL FIELD

This invention relates to a film-type lithium secondary battery and its manufacturing method, and in details to an improvement in an electrode of the film-type lithium secondary battery and an improving method for the electrode.

BACKGROUND ART

In recent years, portable devices such as a portable telephone, a PHS and a small personal computer etc. are undergoing remarkable development in fabrication into small-size and light-weight with a progress of electronics technology. Further, batteries serving as power supplies for use in these portable devices are also required to be built into small-size and light-weight form.

A lithium battery can be mentioned here as an example of a battery to be expected for use in such purpose. In addition to a lithium primary battery already put in practical use, studies have been made on the lithium secondary battery to be put it in practical use, and to achieve its high capacity and long service life.

Almost all of the foregoing various lithium batteries are of cylindrical type. While, in the lithium primary battery, a film-type form is also put in practical use by a manufacturing method for which a solid electrolyte is used and a printing technology is applied. Utilizing this method, many studies have been made to put the film-type form into practical use in fields of the lithium secondary battery and a lithium ion secondary battery, too.

The cylindrical lithium secondary battery is made up through a process in which an electrode group composed of a positive electrode, a negative electrode and a separator is inserted in a cylindrical container and then a liquid electrolyte is filled in it. On the other hand, the film-type lithium secondary battery is made up through a process in which the positive electrode, the negative electrode and the separator composed of a solid-state or a gel-state electrolyte are made up respectively and then laminated one on the other. However, the film-type lithium secondary battery of this type has included such defects as a poor high-rate charge/discharge property and a short cycle life.

The following two points may be considered as reasons for the above defects.

① In case of the cylindrical battery, the electrode group composed of the positive electrode, the negative electrode and the separator is inserted in the cylindrical container and the liquid electrolyte is filled in the container, so that it is easy to control electronic isolation of an electrode active material due to swelling of the liquid electrolyte by applying a potential to the electrode group. In case of the film-type battery, however, the positive electrode and the negative electrode are opposed each other through the electrolyte, so that it is difficult to apply a potential to the electrode.

② Since distribution of the electrolyte in the electrode become not uniform, a degree of transfer of lithium ion in the electrode is small. In addition, since fine corrugations remain on electrode surfaces, a surface resistance between the electrode and the separator is large.

DISCLOSURE OF THE INVENTION

This invention is made in consideration of the above-mentioned problems, and an object of this invention is to provide a film-type lithium secondary battery which includes a small surface resistance of the battery inside and therefore is able to offer a high and stable battery performance, and to provide a manufacturing method by which such a film-type lithium secondary battery can be obtained easily.

A film-type lithium secondary battery of this invention provides a film-type lithium secondary battery in which at least a positive electrode and a negative electrode are installed, the positive electrode and the negative electrode are composed by coating an electrode composite onto a current collector respectively, and the electrode composite contains at least an electrode-active material and a solid-state or a gel-state electrolyte; characterized by that, in at least the positive electrode among the positive and negative electrodes, an electrolyte layer composed only of an electrolyte integrated with the electrolyte in the electrode composite is formed on a surface of the electrode composite, and the positive electrode is opposed against the negative electrode through the electrolyte layer.

In the film-type lithium secondary battery of this invention, since the corrugated surface of the electrode composite is covered with the electrolyte layer, the surface resistance between the electrode and the electrolyte layer is reduced by a large margin. Consequently, the film-type lithium secondary battery of this invention becomes superior in an initial capacity, a high-rate charge/discharge property and a cycle life characteristic etc.

In the film-type lithium secondary battery of this invention, following structures (1) to (5) may be used.

(1) The positive electrode is opposed against the negative electrode only through the electrolyte layer.

In this structure, since the electrolyte of the electrolyte layer is integrated with the electrolyte in the electrode composite, the electrolyte layer has a sufficient mechanical strength. Therefore, the electrolyte layer can serve as a function of the separator so that another separator becomes unnecessary. In addition, the positive electrode becomes in contact with the negative electrode only through their electrolyte layers. As the result, an inside resistance of battery is reduced further. Consequently, the film-type lithium secondary battery of this invention becomes superior in the initial capacity, the high-rate charge/discharge property and the cycle life characteristic etc.

(2) The positive electrode is opposed against the negative electrode through the electrolyte layer and the separator.

In this structure, a contact between the electrode and the separator means a contact between the electrolytes because it means a contact between the electrolyte layer and the separator. Consequently, the film-type lithium secondary battery of this invention becomes superior in the initial capacity, the high-rate charge/discharge property and the cycle life characteristic etc.

(3) A total thickness of the electrolyte layer ranges from 2 $\mu$m to 100 $\mu$m.

According to this structure, an effect gained by forming the electrolyte layer on the surface of electrode composite can be obtained effectively. In other words, when the total thickness of the electrolyte layer is smaller than 2 $\mu$m, the reduction in the surface resistance between the electrode and the electrolyte layer becomes insufficient because there is a possibility that the corrugation of the surface of electrode composite would not be covered completely. When the total thickness of the electrolyte layer is larger than 100 µm, a bulk resistance of the electrolyte layer becomes large. Therefore, in any case there is a possibility that the high-rate charge/discharge property and the cycle life characteristic would not be improved. Especially, when the positive electrode is opposed against the negative electrode only through the electrolyte layer and the total thickness of the electrolyte layer is smaller than 2 µm, an inside short-circuiting is apt to occur because there is a possibility that the corrugation of surface of the electrode composite would not be covered completely. Therefore, this structure is not preferable.

(4) In at least the positive electrode among the positive and negative electrodes, the electrode composite contains the binder, and the electrolyte is distributed uniformly in the electrode composite while maintaining a binding ability provided by the binder.

In this structure, a bulk density of the electrode active material in the electrode composite can be improved, because the binder is contained in the electrode composite so as to maintain the binding ability provided by the binder. In addition, the degree of transfer of lithium ion in the positive electrode can be improved because the electrolyte is distributed uniformly in the electrode composite. Consequently, the film-type lithium secondary battery of this invention becomes superior in the initial capacity, the high-rate charge/discharge property and the cycle life characteristic etc.

In this case, it is preferable to use polyvinylidene fluoride, propylene hexafluoride, or a copolymer of polyvinylidene fluoride and propylene hexafluoride, as the binder.

When the above-mentioned binder is used, a binding ability between electrode active material particles and a binding ability between the electrode composite and the current collector can be obtained sufficiently in order to maintain the electrode property. In addition, a harmful influence of the binder on the electrode reaction can be prevented.

(5)

In at least the positive electrode among the positive and negative electrodes, an organic polymer composing the electrolyte of the electrodeicomposite has both structures providing a high affinity and a low affinity for a liquid electrolyte formed by dissolving an electrolyte salt composing the electrolyte into a plasticizer.

In this structure, since the structures including the high affinity and low affinity for the liquid electrolyte coexist at least in the organic polymer of the electrode composite of the positive electrode, the structures providing the high affinity and low affinity for the liquid electrolyte are phase isolated into micron unit in the organic polymer. For this reason, at least a liquid holding ability of the positive electrode is maintained and a state where the transfer of lithium ion is not prohibited can be realized. On the other hand, since the organic polymer of the separator has a major structure including a high affinity for the liquid electrolyte, so that it has a property to easily restrict the liquid electrolyte. Therefore, when a transfer of the liquid electrolyte occurs due to a transfer of lithium ion at time of charging and discharging, the liquid electrolyte is easily restricted in the separator. However, the lithium ion transfers more easily in the organic polymer of the positive electrode than in the organic polymer of the separator. Therefore, even if the transfer of electrolyte occurs due to the transfer of lithium ion at time of charge/discharge, the restriction of liquid electrolyte in the separator can be controlled, a sufficient amount of the liquid electrolyte can be held in both the positive and negative electrode composites even after progress of charge/discharge cycle, and thus a reduction in the capacity due to the progress of charge/discharge cycle can be controlled.

A manufacturing method of a film-type lithium secondary battery of a first invention of this application is characterized in that at least a positive electrode and a negative electrode are installed, the positive electrode and the negative electrode are composed by coating an electrode composite onto a current collector respectively, and the electrode composite contains at least an electrode active material and a solid-state or a gel-state electrolyte; characterized by that at least the positive electrode among the positive and negative electrodes is made up through following processes (a) to (c), and the positive electrode is opposed against the negative electrode through an electrolyte layer obtained by the following process (c).

(a) a sheet forming process in which at least the electrode active material is mixed in an organic solvent, the mixed solution is coated on the current collector, dried and pressed, so as to form an electrode active material sheet;

(b) an impregnation process in which the electrode active material sheet is dipped in an electrolytic solution prepared by mixing at least an electrolyte salt with an organic monomer having two or more polymeric functional groups at its chain ends, so that the electrolytic solution is impregnated to the electrode active material sheet, and the electrolytic solution is made exist on a surface of the electrode active material sheet in a form of a liquid film;

(c) a polymerizing process in which the organic monomer in the electrolyte is polymerized to form an organic polymer so that the electrolyte in the electrode active material sheet is brought into a solid-state or a gel-state, and an electrolyte layer composed only of the solid-state or the gel-state electrolyte is formed on the surface of the electrode active material sheet.

In the manufacturing method of the first invention, the electrolyte can be distributed uniformly in the electrode active material sheet because the electrolytic solution is impregnated to the electrode active material sheet. In addition, the solid-state or the gel-state electrolyte layer can be formed on the surface of electrode composite because the organic polymer is formed under the state where the electrolytic solution is made exist on the surface of the electrode active material sheet in the form of the liquid film. Therefore, the film-type lithium secondary battery of this invention can be obtained surely.

In the manufacturing method of the first invention, following processes (1) to (3) may be used further.

(1) In the impregnation process, the dipping of the electrode active material sheet into the electrolytic solution is carried out under an ambient pressure reduced from the atmospheric pressure.

According to this process, the electrolyte can be impregnated sufficiently even when a time of impregnation process is short. Therefore, a battery manufacturing process time can be shortened and a production cost can be minimized.

A value of reduction pressure preferably ranges from 0.03 kPa to 15 kPa. Thereby, the electrolyte can be impregnated surely and sufficiently even when the time of impregnation process is short, so that a sufficient initial capacity can be obtained.

(2) In the impregnation process, the dipping of the electrode active material sheet into the electrolytic solution is carried out under an ambient pressure reduced from the atmospheric pressure and then under an ambient pressure increased from the atmospheric pressure.

According to this process, the electrolyte can be impregnated sufficiently even when the time of impregnation process is further shorter than that of the process (1). Therefore, the battery manufacturing process time can be shortened and the production cost can be minimized.

A value of reduction pressure preferably ranges from 0.1 kPa to 15 kPa, and a value of increased pressure is preferably smaller than or equal to 400 kPa. Thereby, the electrolyte can be impregnated surely and sufficiently even when the time of impregnation process is further shorter than that of the process (1), so that a sufficient initial capacity can be obtained.

(3) In the above processes (1) & (2), a process may be used, in which the electrode active material sheet is put in a closed pressure vessel, a pressure in this vessel is reduced from the atmospheric pressure, and then the electrolytic solution is thrown in the closed pressure vessel.

According to this process, the impregnation process can be carried out with a good workability.

A manufacturing method of a film-type lithium secondary battery of a second invention of this application is characterized in that at least a positive electrode and a negative electrode are installed, the positive electrode and the negative electrode are composed by coating an electrode composite onto a current collector respectively, and the electrode composite contains at least an electrode active material and a solid-state or a gel-state electrolyte; characterized by that at least the positive electrode among the positive and negative electrodes is made up through following processes (a) to (c), and the positive electrode is opposed against the negative electrode through an electrolyte layer obtained by the following process (c).

(a) a sheet forming process in which at least the electrode active material is mixed in an organic solvent, the mixed solution is coated on the current collector, dried and pressed, so as to form an electrode active material sheet;

(b) a coating process in which an electrolytic solution prepared by mixing at least an electrolyte salt with an organic monomer having two or more polymeric functional groups at its chain ends, is coated on a surface of the electrode active material sheet, so that the electrolytic solution is permeated into the electrode active material sheet and the electrolytic solution is made exist on a surface of the electrode active material sheet in a form of a liquid film;

(c) a polymerizing process in which the organic monomer in the electrolyte is polymerized to form an organic polymer so that the electrolyte in the electrode active material sheet is brought into a solid-state or a gel-state, and an electrolyte layer composed only of the solid-state or the gel-state electrolyte is formed on the surface of the electrode active material sheet.

In the manufacturing method of the second invention, the solid-state or the gel-state electrolyte layer can be formed on the surface of the electrode composite because the organic polymer is under the state where the electrolytic solution is made exist on the surface of the electrode active material sheet in the form of the liquid film. Therefore, the film-type lithium secondary battery of this invention can be obtained surely. Further, its work can be done easily because the electrolytic solution is coated on the surface of the electrode active material sheet.

A manufacturing method of a film-type lithium secondary battery of a third invention of this application is characterized by that at least a positive electrode and a negative electrode are installed, the positive electrode and the negative electrode are composed by coating an electrode composite onto a current collector respectively, and the electrode composite contains at least an electrode active material and a solid-state or a gel-state electrolyte; characterized in that at least the positive electrode among the positive and negative electrodes is made up through following processes (a) to (d), and the positive electrode is opposed against the negative electrode through an electrolyte layer obtained by the following process (d).

(a) a mixing process to obtain a mixture prepared by mixing at least an electrode active material and an electrolyte salt and an organic monomer having two or more polymeric functional groups at its chain ends;

(b) an sheet forming process in which the mixture is coated on the current collector to form a mixture sheet;

(c) a shelf-leaving process in which the mixture sheet is left on a shelf and the electrode active material in the mixture sheet is settled so as to make the electrolytic solution exist on a surface of the mixture sheet in a form of a liquid film;

(d) a polymerizing process in which the organic monomer in the electrolyte is polymerized to form an organic polymer so that the electrolyte in the mixture sheet is brought into a solid-state or a gel-state, and an electrolyte layer composed only of the solid-state or the gel-state electrolyte is formed on a surface of the mixture sheet.

In the manufacturing method of the third invention, the electrolyte can be distributed uniformly in the mixture sheet because the electrolyte is mixed with the electrode active material. In addition, the solid-state or the gel-state electrolyte layer can be formed on the surface of the electrode composite because the organic polymer is formed under the state where the electrolytic solution is made exist on the surface of the mixture sheet in the form of the liquid film. Therefore, the film-type lithium secondary battery of this invention can be obtained surely.

In the manufacturing methods of the first through third inventions, following processes (1) to (4) may be used further.

(1) A mold releasing film is covered on the surface of the electrode active material sheet or the surface of the mixture sheet with a clearance of desired thickness left between them, so as to make the electrolytic solution exist in the clearance in a form of a liquid film.

According to this process, a thickness of the electrolyte layer can be set to a desired value because the thickness of the electrolyte layer can be controlled by the thickness of the clearance.

(2) A binder is mixed in the process (a).

According to this process, since the electrode active material etc. are pressed with the binder contained in it, a bulk density of the electrode active material can be improved in the electrode active material sheet or the mixture sheet, and in addition the binding ability between the active material particles and that between the electrode composite and the current collector can be maintained by the binder. Therefore, the film-type lithium secondary battery of this invention can be obtained surely.

In this case, it is preferable to use polyvinylidene fluoride, propylene hexafluoride, or a copolymer of polyvinylidene fluoride and propylene hexafluoride, as the binder.

(3) In at least the positive electrode among the positive and negative electrodes, materials having structures providing both high affinity and low affinity for a liquid electrolyte formed by dissolving an electrolyte salt composing the electrolyte in a plasticizer, are used for the organic monomer forming a raw material of the organic polymer composing the electrolyte of the electrode composite.

According to this process, the film-type lithium secondary battery of this invention in which a decrease in capacity with a progress of charge/discharge cycle can be controlled, can be obtained surely.

(4) The positive electrode is opposed against the negative electrode through the separator composed of the solid-state or the gel-state electrolyte and the electrolyte layer.

According to this structure, the film-type lithium secondary battery of this invention can be obtained too.

Figure 1:
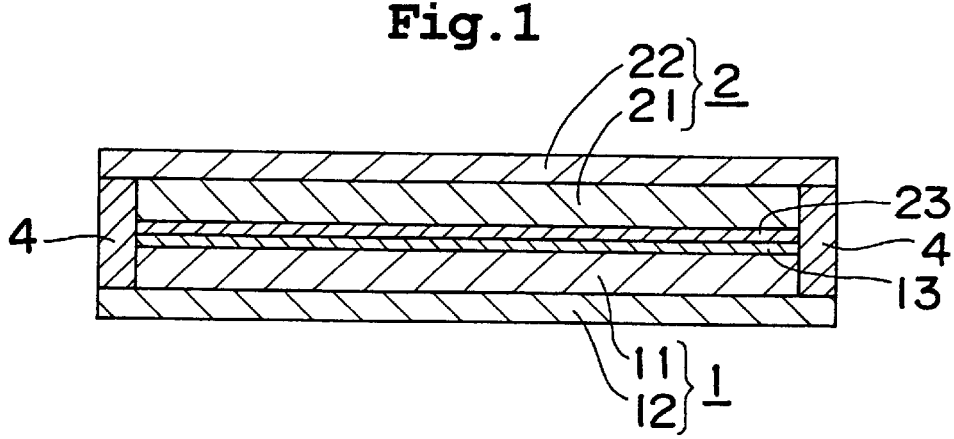
FIG. 1 is a vertical sectional view of a film-type lithium secondary battery of embodiment 1.

posite 21 are opposed each other through the electrolyte layers 13 & 23. End portions of electrode group thus laminated are sealed by an adhesive 4. In this way, the film-type lithium secondary battery is made up.

A manufacturing method of the film-type lithium secondary battery having the foregoing structure will be described hereunder.

[Positive Electrode]

The positive electrode 1 was manufactured through following processes (a) through (c).

(a) Lithium cobalt oxide forming the positive active material was mixed with acetylene black forming the conductive agent, and this mixture was mixed with N-methyl-2-pyrrolidone solution of polyvinylidene fluoride forming the binder. The resulting mixture was coated on the positive current collector 12, dried and pressed so as to form a positive active material sheet having a thickness of 0.1 mm.

(b) In the next stage, $LiBF_4$ of 1 mol/l forming the electrolyte salt was dissolved in γ-butyrolactone forming the plasticizer to prepare a liquid electrolyte, and this liquid electrolyte was mixed with an organic monomer expressed by an equation (I) to prepare an electrolytic solution. The positive active material sheet was dipped in this electrolytic solution under the atmospheric pressure for 15 hours, so that the electrolytic solution was impregnated into the positive active material sheet. Then, the positive active material sheet was taken out of the electrolytic solution. A mold releasing film was coated on a surface of the positive active material sheet under a condition that a clearance having a desired thickness is interposed between them, so that the electrolytic solution was made exist in the clearance, i.e. on the surface of the positive active material sheet in a form of a liquid film.

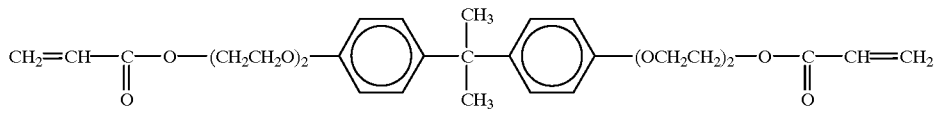

BEST MODE FOR CARRYING OUT THE INVENTION (Embodiment 1)

FIG. 1 is the vertical sectional view of the film-type lithium secondary battery of embodiment 1. In FIG. 1, a positive electrode 1 is made up in such a way that a cathode composite 11 having a major component of lithium cobalt oxide forming a positive active material is coated on a positive current collector 12 composed of an aluminum foil. A negative electrode 2 is made up in such a way that an anode composite 21 having a major component of carbon forming a negative active material is coated on a negative current collector 22 composed of a copper foil. An electrolyte layer 13 is formed on a surface of the cathode composite 11, and an electrolyte layer 23 is formed on a surface of the anode composite 21. The electrolyte layer 13 is composed only of a solid-state or a gel-state electrolyte and integrated with an electrolyte in the cathode composite 11. The electrolyte layer 23 is also composed only of a solid-state or a gel-state electrolyte and integrated with an electrolyte in the anode composite 21. The positive electrode 1 and the negative electrode 2 are laminated one on the other in such a way that the cathode composite 11 and the anode com- (c) Under the foregoing state, electron beam was irradiated on the positive active material sheet and the organic monomer in the electrolyte was polymerized to form an organic polymer. Thereby, the electrolyte in the positive active material sheet and the electrolyte on the surface of the positive active material sheet were brought into solid-state or gel-state. Thereafter, the mold releasing film was removed.

As mentioned above, the cathode composite 11 was formed on the positive current collector 12. Namely, the positive electrode 1 was obtained. The electrolyte layer 13 having an average thickness of 10 μm was formed on the surface of the cathode composite 11. Incidentally, the conductive agent and the plasticizer are not necessarily required.

[Negative Electrode]

The negative electrode 2 was also manufactured in the same way as the positive electrode 1, provided that a carbon was used for the negative active material and a copper foil was used for the negative current collector 22. Thereby, the anode composite 21 was formed on the negative current collector 22, and the electrolyte layer 23 having an average thickness of 10 μm was formed on the surface of the anode composite 21.

[Battery]

The cathode composite 11 was opposed against the anode composite 21 through the electrolyte layers 13 & 23, so that a film-type lithium secondary battery having a capacity of 10. mAh was made up. This battery was named as an invention battery A.

(Embodiment 2)

A fundamental structure of a film-type lithium secondary battery of embodiment 2 is identical with that of embodiment 1 shown in FIG. 1, however, its manufacturing method differs from it a little. The film-type lithium secondary battery of embodiment 2 was manufactured as follows.

[Positive Electrode]

The positive electrode 1 was manufactured through following processes (a) through (c).
   (a) The positive active material sheet having a thickness of 0.1 mm was formed in the same way as the process (a) of embodiment 1.
   (b) The electrolytic solution was made up in the same way as the process (b) of embodiment 1. This electrolytic solution was coated on the surface of the positive active material sheet so as to permeate the electrolytic solution into the positive active material sheet, and make the electrolytic solution exist on the surface of the positive active material sheet in a form of a liquid film. In this instance, the mold releasing film may be used in the same way as the embodiment 1.
   (c) The organic monomer in the electrolyte was polymerized to form an organic polymer in the same way as the process (c) of embodiment 1.

Thereby, the positive electrode 1 was obtained, and the electrolyte layer 13 having an average thickness of 10 μm was formed on the surface of the cathode composite 11.

[Negative Electrode]

The negative electrode 2 was manufactured through following processes (a) through (d).
   (a) The carbon forming the negative active material, the electrolytic solution made up in the same way as the process (b) of embodiment 1 and the organic monomer expressed by the equation (I) were mixed together, so as to obtain a mixture.
   (b) This mixture was coated on the negative current collector 22 to form a mixture sheet having a thickness of 0.1 mm.
   (c) This mixture sheet was left as it was for about two minutes to let the negative active material settle naturally, so as to make the electrolytic solution exist on the surface of the mixture sheet in a form of a liquid film. In this instance, the mold releasing film may be used in the same manner as the embodiment 1.
   (d) The organic monomer in the electrolyte was polymerized to form an organic polymer in the same way as the process (c) of embodiment 1.

Thereby, the anode composite 21 was formed on the negative current collector 22, that is; the negative electrode 2 was obtained. On the surface of the anode composite 21, the electrolyte layer 23 having an average thickness of 1 μm was formed.

[Battery]

A film-type lithium secondary battery having a capacity of 10 mAh was made up in the same way as the embodiment 1. This battery was named as an invention battery B.

(Embodiment 3)

A fundamental structure of a film-type lithium secondary battery of embodiment 3 is identical with that of the embodiment 1 shown in FIG. 1, however, its manufacturing method differs from it a little. The film-type lithium secondary battery of embodiment 3 was manufactured as follows.

[Positive Electrode]

The positive electrode 1 was manufactured through following processes (a) through (d).
   (a) The lithium cobalt oxide forming the positive active material was mixed with the acetylene black forming the conductive agent. This mixture was mixed to the electrolytic solution prepared in the same way as the process (b) of embodiment 1 and the organic monomer expressed by the equation (I) so as to obtain an mixture.
   (b) This mixture was coated on the positive current collector 12 to form a mixture sheet having a thickness of 0.1 mm.
   (c) This mixture sheet was left as it was for about two minutes to let the positive active material settle naturally, so as to make the electrolytic solution exist on the surface of the mixture sheet in a form of a liquid film. In this instance, the mold releasing film may be used in the same manner as the embodiment 1.
   (d) The organic monomer in the electrolyte was polymerized to form an organic polymer in the same way as the process (c) of embodiment 1.

Thereby, the cathode composite 11 was formed on the positive current collector 12, that is; the positive electrode 1 was obtained. On the surface of the cathode composite 11, the electrolyte layer 13 having an average thickness of 1 μm was formed.

[Negative Electrode]

The negative electrode was manufactured in the same way as the embodiment 1. Thereby, the anode composite 21 was formed on the negative current collector 22, and the electrolyte layer 23 having an average thickness of 10 μm was formed on the surface of the anode composite 2.

[Battery]

A film-type lithium secondary battery having a capacity of 10 mAh was made up in the same way as the embodiment 1. This battery was named as an invention battery C.

(Embodiment 4)

A fundamental structure of a film-type lithium secondary battery of embodiment 4 is identical with that of the embodiment 1 shown in FIG. 1, however, its manufacturing method differs from it a little. The film-type lithium secondary battery of embodiment 4 was manufactured as follows.

[Positive Electrode]

The positive electrode was manufactured in the same way as the embodiment 3. Thereby, the cathode composite 11 was formed on the positive current collector 12, that is; the positive electrode 1 was obtained. On the surface of the cathode composite 11, the electrolyte layer 13 having an average thickness of 1 μm was formed.

[Negative Electrode]

The negative electrode was manufactured in the same way as the embodiment 2. Thereby, the anode composite 21 was formed on the negative current collector 22, that is; the negative electrode 2 was obtained. On the surface of the anode composite 21, the electrolyte layer 23 having an average thickness of 1 μm was formed.

[Battery]

A film-type lithium secondary battery having a capacity of 10 mAh was made up in the same way as the embodiment 1. This battery was named as an invention battery D.

(Comparison Embodiment 1)

Figure 2:
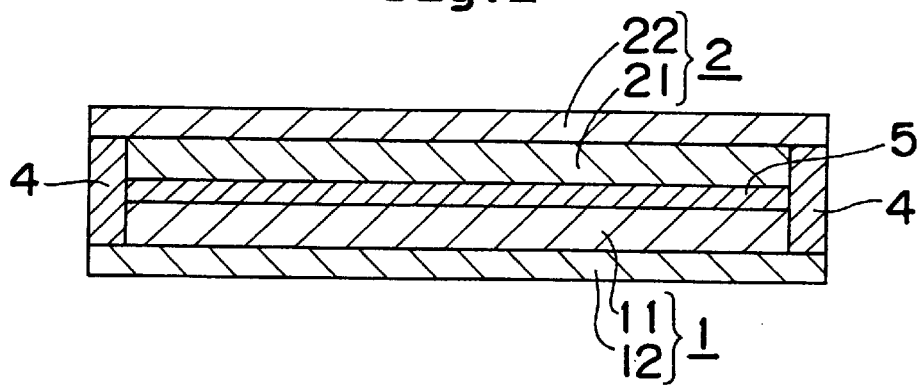
FIG. 2 is a vertical sectional view of a film-type lithium secondary battery of comparison embodiment 1.

FIG. 2 is the vertical sectional view of the film-type lithium secondary battery of comparison embodiment 1. In FIG. 2, components attached with symbols identical with those of FIG. 1 represent components identical or corresponding thereto. In the battery of comparison embodiment 1, the electrolyte layers 13 & 23 are not formed, and the positive electrode 1 is opposed against the negative electrode 2 through the separator 5.

The film-type lithium secondary battery having the above structure was manufactured as follows.

[Positive Electrode]

The positive electrode was manufactured in the same way as the embodiment 1, except that the electrolytic solution was not made exist on the surface of the positive active material sheet in the process (b) of embodiment 1. Thereby, the cathode composite 11 was formed on the positive current collector 12, that is; the positive electrode 1 was obtained. However, the electrolyte layer 13 was not formed on the surface of the cathode composite 11.

[Negative Electrode]

The negative electrode was manufactured in the same way as the above positive electrode. Thereby, the anode composite 21 was formed on the negative current collector 22, that is; the negative electrode 2 was obtained. However, the electrolyte layer 23 was not formed on the surface of the anode composite 21.

[Separator]

$LiBF_4$ of 1 mol/l was dissolved in γ-butyrolactone to prepare the liquid electrolyte, and this liquid electrolyte was mixed with the organic monomer expressed by the equation (I) to prepare an electrolytic solution. This electrolytic solution was coated on the cathode composite 11 and irradiated with electron beam, so that the organic monomer in the electrolytic solution was polymerized to form an organic polymer. Thereby, a separator 5 having an average thickness of 40 μm and composed of a solid-state or a gel-state electrolyte was obtained on the cathode composite 11.

[Battery]

The cathode composite 11 was opposed against the anode composite 21 through the separator 5, so that a film-type lithium secondary battery having a capacity of 10 mAh was made up. This battery was named as a comparison battery X.

(Characteristic Test 1)

Inside short-circuiting occurrence rates were examined on the invention batteries A through D and the comparison battery X. 100 cells were made up for respective batteries, and inside short-circuiting troubles in making up these batteries were examined. Results are listed in Table 1.

TABLE 1

| Battery | Total thickness of electrolyte layer (μm) | Inside short-circuiting occurrence rate (%) |
|---|---|---|
| Invention battery A | 20 | 0 |
| Invention battery B | 11 | 0 |
| Invention battery C | 11 | 0 |
| Invention battery D | 2 | 1 |
| Comparison battery X | 40 (Separator) | 0 |

As obvious from Table 1, the inside short-circuiting trouble scarcely occurred in the invention batteries A through D. The reason of this result can be supposed as a fact that the corrugation on the surface of the cathode composite 11 is covered by the electrolyte layer 13 and that the corrugation on the surface of the anode composite 21 are covered by the electrolyte layer 23. The inside short-circuiting trouble scarcely occurred in the comparison battery X, too. The reason of this result can be supposed as a fact that the corrugation on the surface of the cathode composite 11 and the corrugation on the surface of the anode composite 21 are covered by the separator 5. Since the total thickness of the electrolyte layers 13 & 23 in the invention battery D is 2 μm, it can be supposed that the occurrence of inside short-circuiting trouble can be prevented when the total thickness of the electrolyte layers is larger than or equal to 2 μm.

(Characteristic Test 2)

Figure 3:
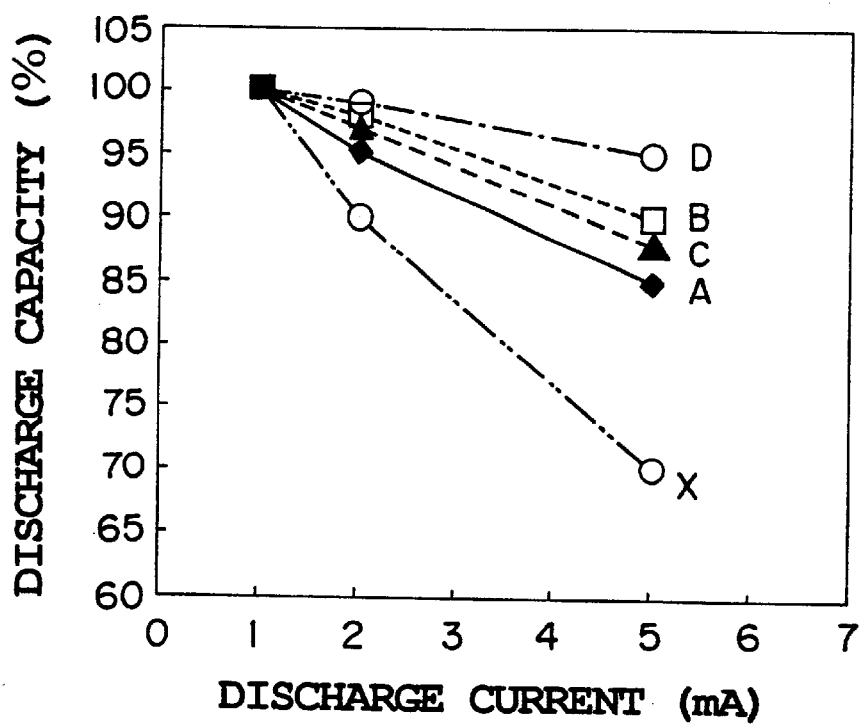
FIG. 3 is a graph showing relations between discharge currents and discharge capacities for respective batteries of embodiments 1 through 4 and comparison embodiment 1.

Discharge tests were carried out at various current values on the invention batteries A through D and the comparison battery X, so that relations between the discharge current and the discharge capacity were measured. Results are shown in FIG. 3. These batteries were subjected to the tests under conditions that charging was done with a current of 1 mA (equivalent to 0.1 CmA) at a temperature of 20° C. up to a final voltage of 4.2 V, and then discharging was done with various current values up to a final voltage of 2.7 V. The discharge capacities were shown by percentages on the assumption that a capacity obtained when the discharging was done at a current of 1 mA was 100.

As seen from FIG. 3, when the discharge current was 1 mA, all of the invention batteries A through D and the comparison battery X could attain discharge capacities of about 95 to 100% of the design capacity. When the discharge current was 5 mA, however, the comparison battery X could attain a discharge capacity of only about 70% of the value attained at time of discharge current of 1 mA but the invention batteries A through D could attain discharge capacities of 85 to 95% of that value.

Reasons for these results may be considered as follows. In the invention batteries A through D, the electrolyte layer 13 integrated with the electrolyte in the cathode composite 11 is formed on the surface of the cathode composite 11 and the electrolyte layer 23 integrated with the electrolyte in the anode composite 21 is formed on the surface of the anode composite 21, and these electrolyte layers 13 & 23 are utilized as the separator. Therefore, a physical boundary surface between the electrode and the separator does not exist. In addition, the electrolyte layers 13 & 23 contact each other at a layer boundary surface between the positive electrode 1 and the negative electrode 2. For this reason, a surface resistance is reduced by a large margin. On the contrary, since the separator 5 independent of the electrolyte in the electrode is formed in the comparison battery X, the physical boundary surfaces exist between the positive electrode 1 and the separator 5 and between the negative electrode 2 and the separator 5. Consequently, the transfer of lithium ion is prohibited by that surface resistance so that the discharge capacity at time of high-rate discharge lowers abruptly.

(Characteristic Test 3)

Figure 4:
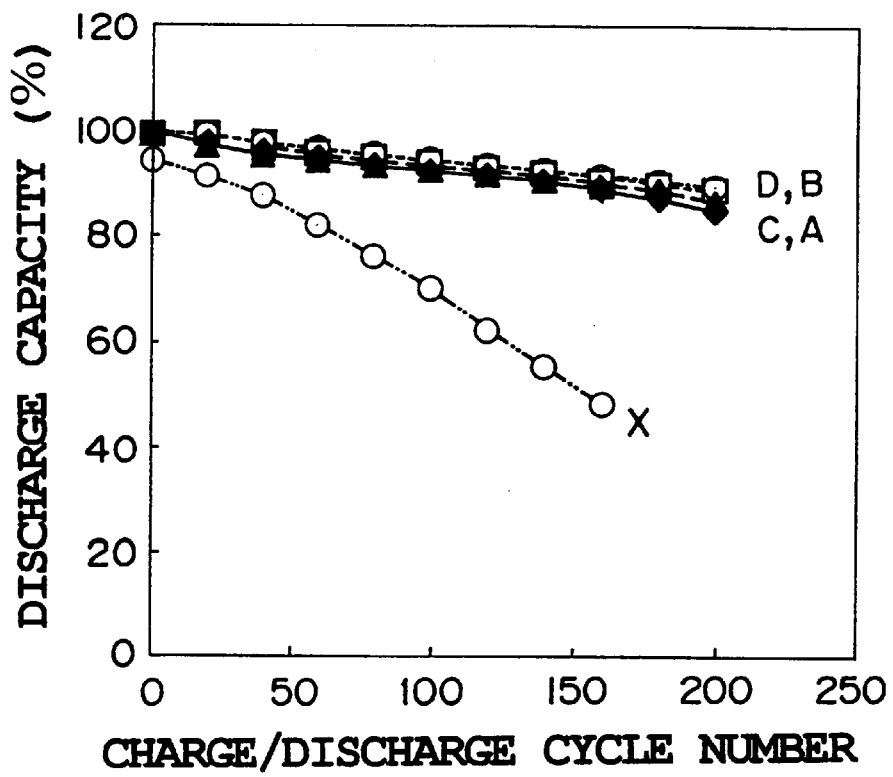
FIG. 4 is a graph showing relations between charge/discharge cycle numbers and discharge capacities for respective batteries of embodiments 1 through 4 and comparison embodiment 1.

Charge/discharge cycle tests were carried out on the invention batteries A through D and the comparison battery X, so that relations between the charge/discharge cycle number and the discharge capacity were measured. Results are shown in FIG. 4. These batteries were subjected to the tests under conditions that charging was done with a current of 1 mA at a temperature of 20° C. up to a final voltage of 4.2 V, and then discharging was done with a current of 1 mA up to a final voltage of 2.7 V. The discharge capacities are shown by percentages on the assumption that a design capacity of the positive electrode is 100.

As seen from FIG. 4, all of the invention batteries A through D and the comparison battery X could attain discharge capacities of about 95 to 100% of the design capacity at initial stages of charging and discharging, so that these batteries worked well at initial stages of charging and discharging. In the comparison battery X, however, its capacity decreased gradually with an elapse of charge/discharge cycle, and fell below 50% of the design capacity at 150th cycle. On the contrary, the invention batteries A through D could attain not only discharge capacities of about 100% of the design capacity from initial stages of charging and discharging, but discharge capacities of more than or equal to 85% of the design capacity even after elapse of 200 cycles although a slight capacity decrease was recognized.

Reasons for these results may be considered as follows. In case of the comparison battery X, since the boundary surface condition between the positive electrode 1 and the separator 5 and the boundary condition between the negative electrode 2 and the separator 5 are not uniform, the surface resistance increases and the capacity falls down with an elapse of cycle. On the contrary, in the invention batteries A through D, since the boundary condition between the electrolyte layers 13 & 23 is comparatively uniform, the surface resistance is hard to increase and the capacity can be maintained easily even after the progress of cycle.

(Embodiment 5)

A film-type lithium secondary battery having a capacity of 10 mAh was made up in the same way as that of the embodiment 1 except that the thicknesses of the electrolyte layers 13 & 23 were changed variously by using a mold releasing film. These batteries were named as invention batteries A2 through A5 and listed in Table 2.

TABLE 2

| Invention battery | Thickness of electrolyte layer 13 (μm) | Thickness of electrolyte layer 23 (μm) |
|---|---|---|
| A | 10 | 10 |
| A2 | 20 | 10 |
| A3 | 40 | 40 |
| A4 | 60 | 40 |
| A5 | 80 | 10 |

(Characterist Test 4)

Inside short-circuiting occurrence rates of the invention batteries A2 through A5 were examined in the same way as the characteristic test 1. As the result, the short-circuiting trouble did not occur in any battery.

(Characteristic Test 5)

Figure 5:
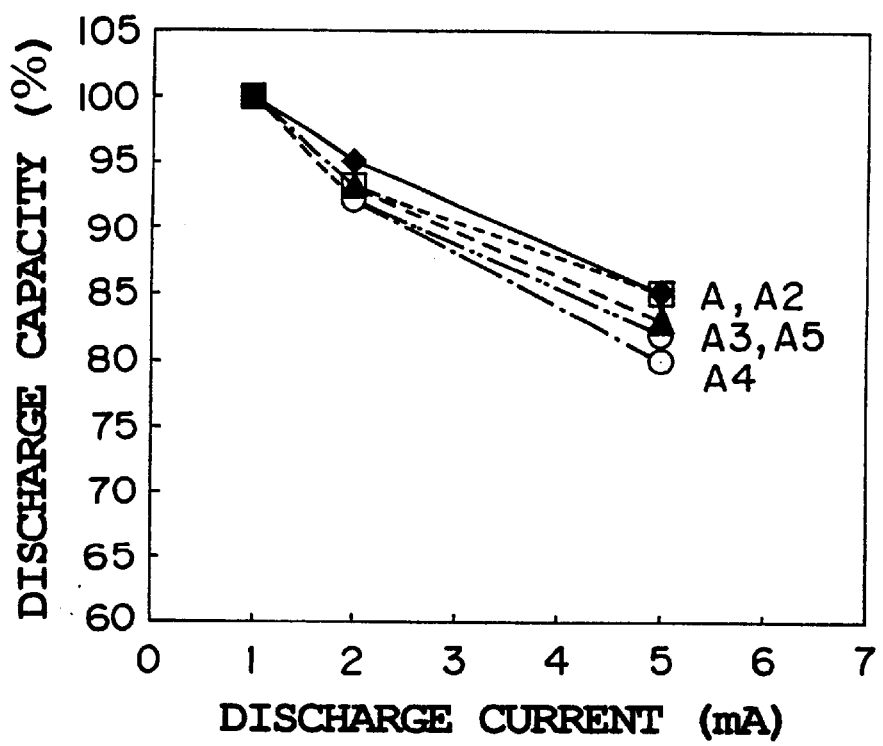
FIG. 5 is a graph showing relations between discharge currents and discharge capacities for respective batteries of embodiment 5.

Relations between the discharge current and the discharge capacity were measured on the invention batteries A2 through A5 in the same way as the characteristic test 2. Results are shown in FIG. 5. As seen from FIG. 5, all of the batteries could attain discharge capacities of 80 to 85% of the design capacity even at a discharge current of 5 mA. Incidentally, since the total thickness of the electrolyte layers 13 & 23 of the invention battery A4 is 100 μm, it can be said that the high-rate charge/discharge performance is not deteriorated due to an increase in the bulk resistance of the electrolyte layer, provided that the total thickness of the electrolyte layer is smaller than or equal to 100 μm.

(Embodiment 6)

Figure 6:
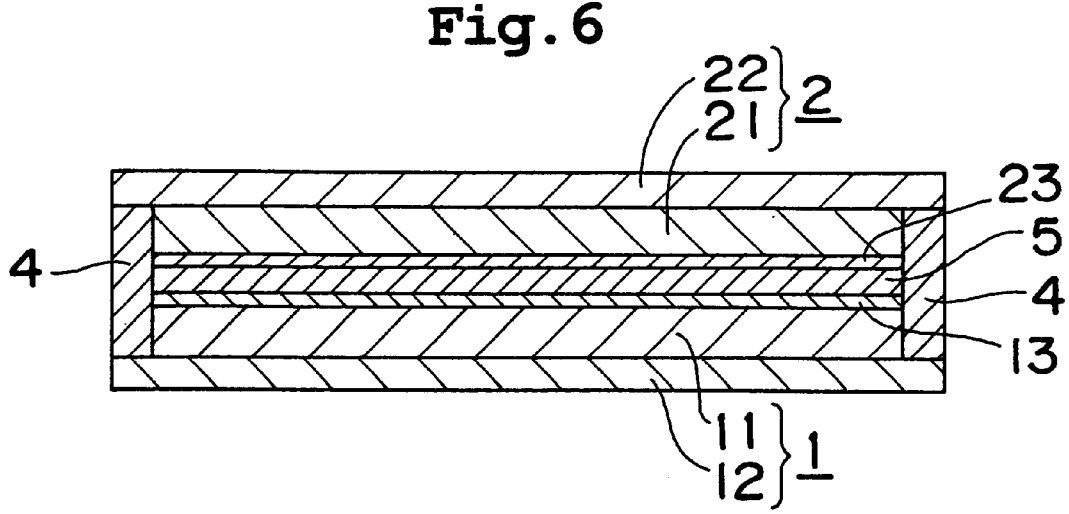
FIG. 6 is a vertical sectional view of a film-type lithium secondary battery of embodiment 6.

FIG. 6 is the vertical sectional view of the film-type lithium secondary battery of embodiment 6. In FIG. 6, components attached with symbols identical with those of FIG. 1 and FIG. 2 represent components identical or corresponding thereto. In the battery of embodiment 6, the electrolyte layers 13 & 23 are formed, and the positive electrode 1 is opposed against the negative electrode 2 through the electrolyte layers 13 & 23 and the separator 5.

The film-type lithium secondary battery having the above structure was manufactured as follows.

[Positive Electrode]

The positive electrode was manufactured in the same way as the embodiment 1. Thereby, the cathode composite 11 was formed on the positive current collector 12, that is: the positive electrode 1 was obtained. On the surface of the cathode composite 11, the electrolyte layer 13 having an average thickness of 10 μm was formed. The electrolyte in the cathode composite 11 is distributed uniformly in the cathode composite 11 while maintaining the binding ability provided by the binder.

[Negative Electrode]

The negative electrode was manufactured in the same way as the embodiment 1. Thereby, the anode composite 21 was formed on the negative current collector 22, that is: the negative electrode 2 was obtained. On the surface of the anode composite 21, the electrolyte layer 23 having an average thickness of 10 μm was formed. The electrolyte in the anode composite 21 was distributed uniformly in the anode composite 21 while maintaining the binding ability provided by the binder.

[Separator]

LiBF$_4$ of 1 mol/l was dissolved in γ-butyrolactone to prepare the liquid electrolyte, and this liquid electrolyte was mixed with the organic monomer expressed by the equation (II) to prepare the electrolytic solution. This electrolytic solution was coated on the electrolyte layer 13 of the cathode composite 11 and irradiated with electron beam. Thus, the organic monomer in the electrolytic solution was polymerized to form an organic polymer. Thereby, the separator 5 having an average thickness of 40 μm and composed of a solid-state or a gel-state electrolyte was obtained on the electrolyte layer 13.

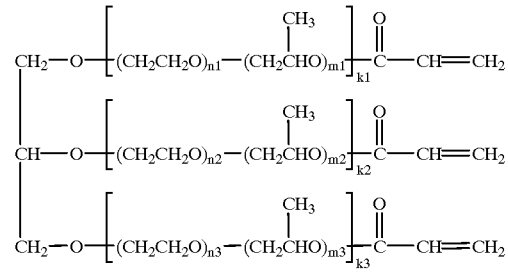

(k, m, or n is a integer of more than or equal to 1)

[Battery]

The cathode composite 11 was opposed to the anode composite 21 through the electrolyte layers 13 & 23 and the separator 5, so that a film-type lithium secondary battery having a capacity of 10 mAh was made up. This battery was named as an invention battery E.

(Embodiment 7)

Figure 7:
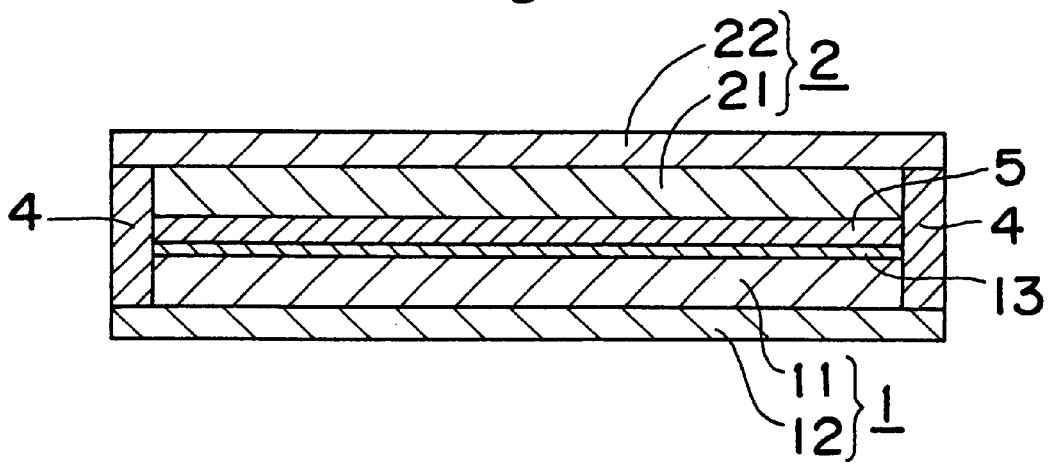
FIG. 7 is a vertical sectional view of a film-type lithium secondary battery of comparison embodiment 7.

FIG. 7 is the vertical sectional view of the film-type lithium secondary battery of embodiment 7. In FIG. 7, components attached with symbols identical with those of FIG. 1 and FIG. 2 represent components identical or corresponding thereto. In the battery of embodiment 7, the electrolyte layer 13 is formed, and the positive electrode 1 is opposed against the negative electrode 2 through the electrolyte layer 13 and the separator 5.

The film-type lithium secondary battery having the above structure was manufactured as follows.

[Positive Electrode]

The positive electrode was manufactured in the same way as the embodiment 6. Thereby, the cathode composite 11 was formed on the positive current collector 12, that is: the positive electrode 1 was obtained. On the surface of the cathode composite 11, the electrolyte layer 13 having an average thickness of 10 μm was formed. The electrolyte in the cathode composite 11 was distributed uniformly in the cathode composite 11 while maintaining the binding ability provided by the binder.

[Negative Electrode]

A carbon forming the negative active material, a liquid electrolyte prepared by dissolving $LiBF_4$ of 1 mol/l into γ-butyrolactone and the organic monomer expressed by the equation (I), were mixed together to form a mixture. This mixture was coated on the negative current collector 22 and immediately irradiated with electron beam. Thus, the organic monomer was polymerized to form an organic polymer. Thereby, the anode composite 21 was formed on the negative current collector 22, but the electrolyte layer 23 was not formed on the surface of the anode composite 21. The anode composite 21 did not contain the binder.

[Separator]

The separator was manufactured in the same way as that of the embodiment 6.

[Battery]

The cathode composite 11 was opposed against the anode composite 21 through the electrolyte layer 13 and the separator 5, so that a film-type lithium secondary battery having a capacity of 10 mAh was made up. This battery was named as an invention battery F.

(Comparison Embodiment 2)

Figure 8:
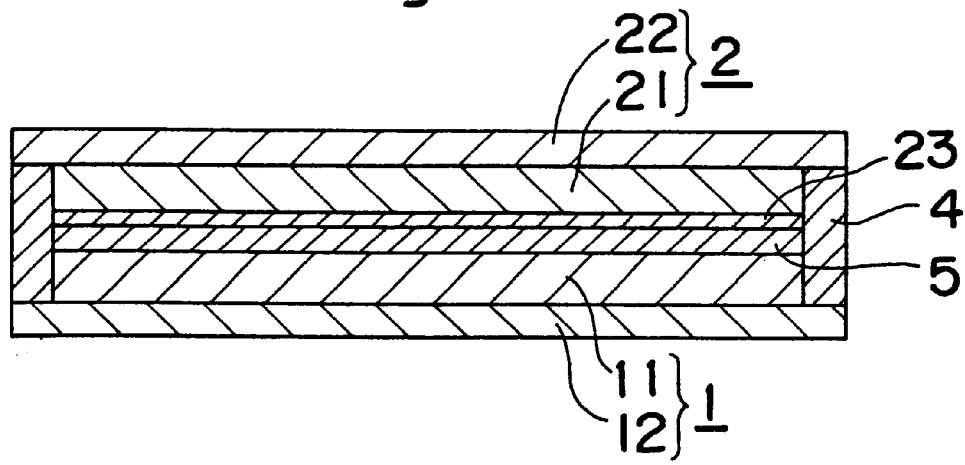
FIG. 8 is a vertical sectional view of a film-type lithium secondary battery of comparison embodiment 2.

FIG. 8 is the vertical sectional view of the film-type lithium secondary battery of comparison embodiment 2. In FIG. 8, components attached with symbols identical with those of FIG. 1 and FIG. 2 represent components identical or corresponding thereto. In the battery of comparison embodiment 2, the electrolyte layer 23 is formed, and the positive electrode 1 is opposed against the negative electrode 2 through the electrolyte layer 23 and the separator 5.

The film-type lithium secondary battery having the above structure was manufactured as follows.

[Positive Electrode]

A lithium cobalt oxide forming the positive active material was mixed with an acetylene black forming the conductive agent. This mixture was further mixed with a liquid electrolyte, which was prepared by dissolving $LiBF_4$ of 1 mol/l into γ-butyrolactone, and the organic monomer expressed by the equation (I). The resulting mixture was coated on the positive current collector 12 and immediately irradiated with electron beam. Thus, the organic monomer was polymerized to form an organic polymer. Thereby, the cathode composite 11 was formed on the positive current collector 12, but the electrolyte layer 13 was not formed on the surface of the cathode composite 11. The cathode composite 11 did not contain the binder.

[Negative Electrode]

The negative electrode was manufactured in the same way as the embodiment 6. Thereby, the anode composite 21 was formed on the negative current collector 22, that is; the negative electrode 2 was obtained. On the surface of the anode composite 21, the electrolyte layer 23 having an average thickness of 10 μm was formed. The electrolyte in the anode composite 21 was dissolved uniformly in the anode composite 21 while maintaining the binding ability provided by the binder.

[Separator]

The separator was manufactured in the same way as the embodiment 6.

[Battery]

The cathode composite 11 was opposed against the anode composite 21 through the electrolyte layer 23 and the separator 5, so that a film-type lithium secondary battery having a capacity of 10 mAh was made up. This battery was named as a comparison battery Y.

(Comparison Embodiment 3)

A fundamental structure of a film-type lithium secondary battery of comparison embodiment 3 is identical with that of the comparison embodiment 1 shown in FIG. 2, however, its manufacturing method differs from it a little. The film-type lithium secondary battery of comparison embodiment 3 was manufactured as follows.

[Positive Electrode]

The positive electrode was manufactured in the same way as the comparison embodiment 2. Thereby, the cathode composite 11 was formed on the positive current collector 12, but the electrolyte layer 13 was not formed on the surface of the cathode composite 11. The cathode composite 11 did not contain the binder.

[Negative Electrode]

The negative electrode was manufactured in the same way as the embodiment 7. Thereby, the anode composite 21 was formed on the negative current collector 22, but the electrolyte layer 23 was not formed on the surface of the anode composite 21. The anode composite 21 did not contain the binder.

[Separator]

The separator was manufactured in the same way as the embodiment 6.

[Battery]

The cathode composite 11 was opposed against the anode composite 21 through the separator 5, so that a film-type lithium secondary battery having a capacity of 10 mAh was made up. This battery was named as a comparison battery Z.

(Characteristic Test 6)

Figure 9:
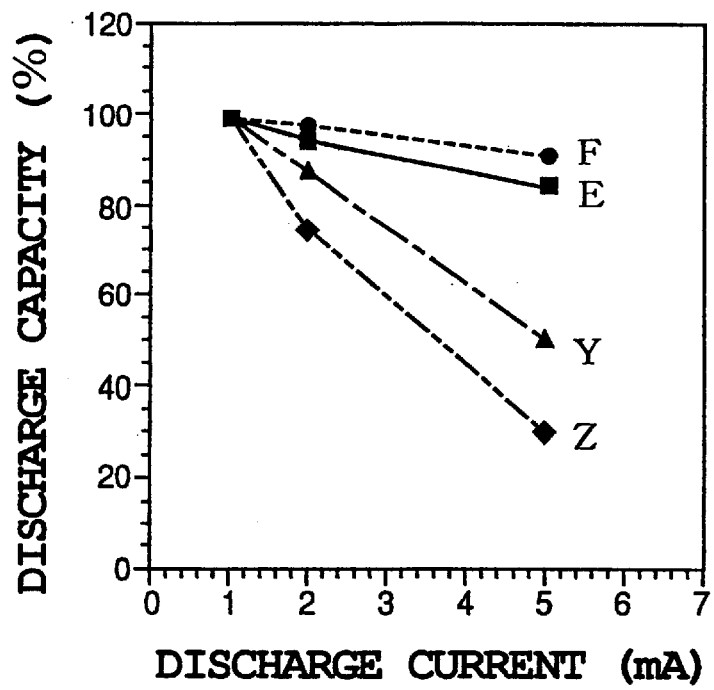
FIG. 9 is a graph showing relations between discharge currents and discharge capacities for respective batteries of embodiment 6 & 7 and comparison embodiments 1 & 2.

Discharge tests were carried out at various current values on the invention batteries E & F and the comparison batteries Y & Z, so that relations between the discharge current and the discharge capacity were measured in the same way as the characteristic test 2. Results are shown in FIG. 9. As seen from FIG. 9, when the discharge current was 1 mA, all of the invention batteries E & F and the comparison batteries Y & Z could attain discharge capacities of about 90 to 100% of the design capacity. When the discharge current was 5 mA, however, the comparison battery Z could attain a discharge capacity of only about 30% of the value attained at time of discharge current of 1 mA, and even the comparison battery Y could attain a discharge capacity of about 50% of that value. However, the invention batteries E & F could attain discharge capacities of 85 to 90% of that value.

Following synergistic effects ① and ② may be considered for causes of these results.

① In the invention batteries E & F, the cathode composite 11 of the positive electrode 1 contains the binder. In the cathode composite 11, the electrolyte uniformly distributed by being impregnated is brought into the solid-state or the gel-state by the polymerization of organic monomer. Thereby, the condition wherein the electrolyte is uniformly distributed in the cathode composite 11 is realized, while maintaining the binding ability between the active material particles and the binding ability between the cathode composite 11 and the positive current collector 12, which are provided by the binder. For this reason, a reaction ability of the cathode composite 11 is improved. The same effects may be considered in the anode composite 21 of the invention battery E, too.

② Since the electrolyte layer 13 is formed on the surface of the cathode composite 11 of the invention batteries E & F, the corrugation of the surface of the cathode composite 11 is covered by the electrolyte layer 13. For this reason, the electrolytes actually become in contact each other at a contact surface between the cathode composite 11 and the separator 5, so that the surface resistance is reduced between the cathode composite 11 and the separator 5. The same effects may be considered in the anode composite 21 of the invention battery E, too.

(Characteristic Test 7)

Charge/discharge cycle tests were carried out on the invention batteries E & F and the comparison batteries Y & Z in the same way as the characteristic test 3, so that relations between the charge/discharge cycle number and the discharge capacity were measured. Results are shown in FIG. 10.

Figure 10:
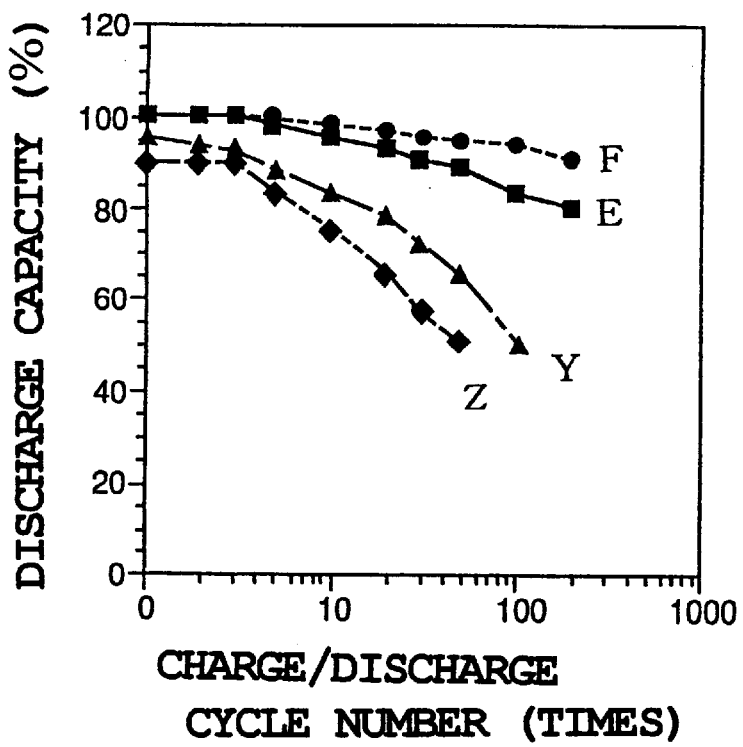
FIG. 10 is a graph showing relations between charge/discharge cycle numbers and discharge capacities for respective batteries of embodiments 6 & 7 and comparison embodiments 1 & 2.

As seen from FIG. 10, all of the invention batteries E & F and the comparison batteries Y & Z could attain discharge capacities of about 90 to 100% of the design capacity at initial stages of charging and discharging, so that these batteries worked well at initial stages of charging and discharging. In the comparison batteries Y & Z, however, their capacities decreased gradually with an elapse of charge/discharge cycle, and fell below 50% of the design capacity at 50th cycle for the comparison battery Z and at 100th cycle for the comparison battery Y, respectively. On the contrary, the invention batteries E & F could attain not only discharge capacities of about 100% of the design capacity from the initial stages of charging and discharging, but discharge capacities of more than or equal to 80% of the design capacity even after elapse of 200 cycles although a slight capacity decrease was recognized.

Following synergistic effects ① and ② may be considered for causes of these results.

① Reaction abilities of the electrode composites 11 & 12 containing the binder are improved in the invention batteries E & F, in the same manner as the foregoing ①.

② In the invention batteries E & F, the organic monomer expressed by the equation (I) is used for the positive electrode 1 and the negative electrode 2, and the organic monomer expressed by the equation (II) is used for the separator 5. Namely, different organic monomers are used for the electrodes 1 & 2 and the separator 5. In the organic polymer formed by polymerizing the organic monomer of the electrodes 1 & 2, the ethylene oxide structure including the high affinity for the liquid electrolyte coexists with the alkyl structure and the benzene structure having the low affinity for the liquid electrolyte, so that the structure having the high affinity for the liquid electrolyte and the structure having the low affinity therefor are phase isolated into micron unit. For this reason, the liquid holding ability is maintained in the electrodes 1 & 2 and the state where transfer of lithium ion is not prohibited can be realized. On the other hand, since the organic polymer formed by polymerizing the organic monomer of the separator 5 has major components of the ethylene oxide structure and the propylene oxide structure including the high affinity for the liquid electrolyte, it has the property to easily restrict the liquid electrolyte. Therefore, when the transfer of liquid electrolyte occurs due to the transfer of lithium ion at time of charging and discharging, the liquid electrolyte is easily restricted in the separator 5. However, the lithium ion transfers more easily in the organic polymer of the electrodes 1 & 2 than in the organic polymer of the separator 5. Therefore, even if the transfer of liquid electrolyte occurs due to the transfer of lithium ion at time of charging and discharging, the restriction of liquid electrolyte in the separator 5 can be controlled, a sufficient amount of the liquid electrolyte can be held in both the electrodes 1 & 2 even after the progress of charge/discharge cycle, and thus the decrease in capacity due to the progress of charge/discharge cycle can be controlled.

(Embodiment 8)

Invention batteries E2 through E8 were made up, and initial discharge capacities were measured.

The invention batteries E2 through E8 forming the film-type lithium secondary battery having a capacity of 10 mAh were made up in the same way as that of the invention battery E of embodiment 6, except that the dipping method of the positive active material sheet into the electrolytic solution in the manufacture of the positive electrode 1 and the dipping method of the negative active material sheet into the electrolytic solution in the manufacture of the negative electrode 2, that is; the dipping methods of the electrode active material sheets into the electrolytic solution, in the manufacturing method of the invention battery E of embodiment 6, were carried out as follows. The electrode active material sheet was put in the sealed pressure vessel, a pressure in the sealed pressure vessel was reduced from the atmospheric pressure, then an excessive amount of the electrolytic solution was thrown in the sealed pressure vessel, and the sheet was left as it was for three minutes. Thus, the reduced pressure value, i.e. the impregnation pressure was changed variously to make up the invention batteries E2 through E8.

Initial discharge capacities were measured on the invention batteries E2 through E8. Results are listed in Table 3. These batteries were subjected to tests under conditions that charging was done with a current of 1 mA (equivalent to 0.1 CmA) at a temperature of 20° C. up to a final voltage of 4.2 V, and then discharging was done with a current of 1 mA up to a final voltage of 2.7 V. The discharge capacities were shown by percentages when the design capacity was assumed as 100.

TABLE 3

| Invention battery | Impregnation pressure (kPa) | Initial discharge capacity (%) |
|---|---|---|
| E2 | 0.03 | 92 |
| E3 | 0.05 | 100 |
| E4 | 0.1 | 100 |
| E5 | 1 | 100 |
| E6 | 4 | 97 |
| E7 | 8 | 95 |
| E8 | 15 | 80 |

As obvious from Table 3, the invention batteries E2 through E8 could attain satisfactory initial discharge capacities in spite of such a short impregnation process time as three minutes, and could attain satisfactorily sufficient initial discharge capacities especially at impregnation pressures varying from 0.03 kPa to 8 kPa. For the cause of this result, it can be considered that air existing in cavities of the electrode active material sheet was removed within a short time and at the same time intruded in cavities of the electrolytic solution within a short time, because the impregnation was done under the pressure reduced from the atmospheric pressure. In this instance, it can be supposed that even the invention batteries E2, E6, E7 and E8 could attain initial charge capacities of 100% when the impregnation process time was prolonged a little longer.

As described above, since the impregnation of the electrolytic solution into the electrode active material sheet is carried out within a short time in the invention batteries E2 through E8, a battery manufacturing process time is shortened and a production cost is reduced.

(Embodiment 9)

Invention batteries E9 through E11 were made up, and initial discharge capacities were measured.

The invention batteries E9 through E11 forming the film-type lithium secondary battery having a capacity of 10 mAh were made up in the same way as that of the embodiment 8, except that the dipping method of the electrode active material sheet into the electrolytic solution was carried out as follows. The electrode active material sheet was put in the sealed pressure vessel, a pressure in the sealed pressure vessel was reduced from the atmospheric pressure, then an excessive amount of the electrolytic solution was thrown in the sealed pressure vessel, and the sheet was left as it was for one minute, and the pressure in the pressure vessel was increased from the atmospheric pressure and the sheet was left as it was for one minute. The reduced pressure value and the increased pressure value, i.e. the impregnation pressure values were changed variously to make up the invention batteries E9 through E11.

Initial discharge capacities were measured on the invention batteries E9 through E11 in the same way as the embodiment 8. Results are listed in Table 4.

TABLE 4

| Invention battery | Impregnation pressure (kPa) | Initial discharge capacity (%) |
|---|---|---|
| E9 | 0.1→300 | 100 |
| E10 | 0.1→400 | 98 |
| E11 | 15→300 | 88 |

As obvious from Table 4, the invention batteries E9 through E11 could attain satisfactory initial discharge capacities in spite of such a short impregnation process time as the total two minutes. For the cause of this result, it can be considered that the reducing pressure from the atmospheric pressure and the increasing pressure therefrom led to a smooth progress of impregnation as compared with the case of the embodiment 8. In this instance, it can be supposed that even the invention batteries E10 & E11 could attain initial discharge capacities of 100% when the impregnation process time was prolonged a little longer.

(Embodiment 10)

Invention batteries E12 & E13 were made up, and initial discharge capacities were measured.

The invention batteries E12 & E13 forming the film-type lithium secondary battery having a capacity of 10 mAh were made up in the same way as that of the invention battery E of embodiment 6, except that manufacture of the positive electrode 1 and manufacture of the negative electrode 2, that is; manufacture of the electrodes was carried out as follows. A rolled sheet was used for the current collector, and an electrode active material sheet having a thickness of 0.1 mm was formed on the current collector in the same way as the invention battery E, which was in turn taken up to be brought into a scroll. The electrode active material sheet in the form of scroll was put in the sealed pressure vessel as it was, and a pressure in the vessel was reduced from the atmospheric pressure. An excessive amount of the electrolytic solution was thrown in the sealed pressure vessel, and the scroll was left as it was for one minute. The pressure was increased from the atmospheric pressure, and the scroll was left as it was for 15 hours. Thereby, the electrolytic solution was impregnated into the electrode active material sheet. In the next stage, electron beam was irradiated on the electrode active material sheet to polymerize the organic monomer so as to form the organic polymer, in the same way as the case of the invention battery E. The electrodes 1 & 2 thus prepared were cut to predetermined sizes to be put in use. The reduced pressure value and the increased pressure value, i.e. the impregnation pressure values were changed variously to make up the invention batteries E12 & E13.

Initial discharge capacities were measured on the invention batteries E12 & E13 in the same way as the embodiment 8. Results are listed in Table 5.

TABLE 5

| Invention battery | Impregnation pressure (kPa) | Initial discharge capacity (%) |
|---|---|---|
| E12 | 0.1→300 | 97 |
| E13 | 15→300 | 72 |

In case when the electrolytic solution is impregnated into the rolled electrode active material sheet, it can be considered that the removal of air existing in cavities of the electrode active material sheet and the intrusion of the electrolytic solution into cavities of, can not be carried out sufficiently. However, the invention batteries E12 & E13 could attain satisfactory initial discharge capacities, as understood from Table 5. For the cause of this result, it can be considered that the impregnation was progressed smoothly because the pressure in the pressure vessel was reduced from the atmospheric pressure and then increased therefrom. In this instance, it can be supposed that even the invention batteries E12 & E13 could attain initial discharge capacities of 100% when the impregnation process time was prolonged a little longer.

Industrial Applicability

This invention can provide a film-type lithium secondary battery which includes a small surface resistance in the battery and therefore is able to offer a high and stable battery performance. Therefore, it is very useful in and applicable to the battery industry.

What is claimed is:

1. A method of making a lithium secondary battery, comprising:

making a positive electrode by coating an electrode composite onto a current collector, wherein the electrode composite contains at least a positive active material and a solid-state or a gel-state electrolyte;

making a negative electrode by coating an electrode composite onto a current collector wherein the electrode composite contains at least a negative active material and a solid-state or a gel-state electrolyte;

wherein at least one of the positive electrode or the negative electrode is made by:

(a) mixing an electrode active material in an organic solvent to form a solution; coating the solution on a current collector; drying and pressing the coated solution, thereby forming an electrode active material sheet;

(b) dipping the electrode active material sheet in an electrolytic solution prepared by mixing an electrolyte salt with an organic monomer having two or more polymeric functional groups at its chain ends, so that the electrode active material sheet is impregnated with the electrolytic solution and forms a liquid film of the electrolytic solution on a surface of the electrode active material sheet;

(c) covering the surface of the electrode active material sheet with a mold releasing film and leaving a clearance of a desired thickness between them so the electrolytic solution exists in the clearance as the liquid film; and (d) polymerizing the organic monomer to form an organic polymer so that the electrolyte in the electrode active material sheet is brought into a solid-state or a gel-state, and an electrolyte layer composed only of the solid-state or the gel-state electrolyte is formed on a surface of the electrode active material sheet, wherein the positive electrode is opposite the negative electrode through the electrolyte layer.

2. A method of making a lithium secondary battery, comprising:

making a positive electrode by coating an electrode composite onto a current collector, wherein the electrode composite contains at least a positive active material and a solid-state or a gel-state electrolyte;

making a negative electrode by coating an electrode composite onto a current collector, wherein the electrode composite contains at least a negative active material and a solid-state or a gel-state electrolyte, wherein at least one of the positive electrode or negative electrode is made by:

(a) mixing an electrode active material in an organic solvent to form a solution; coating the solution on a current collector; drying and pressing the coated solution, thereby forming an electrode active material sheet;

(b) preparing an electrolytic solution by mixing at least an electrolyte salt with an organic monomer having two or more polymeric functional groups at its chain ends; coating the electrolytic solution on a surface of the electrode active material sheet, so that the electrolytic solution is permeated into the electrode active material sheet and the electrolytic solution exists on a surface of the electrode active material sheet as a liquid film;

(c) covering the surface of the electrode active material sheet with a mold releasing film and leaving a clearance of a desired thickness between them so as to make the electrolytic solution exist in the clearance as the liquid film; and (d) polymerizing the organic monomer to form an organic polymer, so that the electrolyte in the electrode active material sheet is brought into a solid-state or a gel-state, and an electrolyte layer composed only of the solid-state or the gel-state electrolyte is formed on a surface of the electrode active material sheet, wherein the positive electrode is opposite the negative electrode through the electrolyte layer.

3. A method of making a lithium secondary battery, comprising:

making a positive electrode by coating an electrode composite onto a current collector, wherein the electrode composite at least contains a positive active material and a solid-state or a gel-state electrolyte;

making a negative electrode by coating an electrode composite onto a current collector, wherein the electrode composite at least contains a negative active material and a solid-state or a gel-state electrolyte;

wherein at least one of the positive electrode or the negative electrode is made by:

(a) mixing an electrode active material and an electrolyte salt and an organic monomer having two or more polymeric functional groups at its chain ends to form a mixture;

(b) coating the mixture on a current collector to form a mixture sheet;

(c) covering the surface of the mixture sheet with a mold releasing film and leaving a clearance of a desired thickness between them so as to make the electrolytic solution exist in the clearance as a liquid film;

(d) leaving the mixture sheet on a shelf, thereby settling the electrode active material in the mixture sheet; and (e) polymerizing the organic monomer to form an organic polymer so that the electrolyte in the mixture sheet is brought into a solid-state or a gel-state, and an electrolyte layer composed only of the solid-state or the gel-state electrolyte is formed on a surface of the mixture sheet, wherein the positive electrode is opposite the negative electrode through the electrolyte layer.

4. A method of making a lithium secondary battery according to claim 1, wherein the dipping is carried out under a pressure reduced from atmospheric pressure.

5. A method of making a lithium secondary battery according to claim 4, wherein the reduced pressure value ranges from 0.03 kPa to 15 kPa.

6. A method of making a lithium secondary battery according to claim 1, wherein the dipping is carried out under a pressure reduced from atmospheric pressure and then under a pressure increased from atmospheric pressure.

7. A method of making a lithium secondary battery according to claim 6, in which the reduced pressure ranges from 0.1 kPa to 15 kPa, and the increased pressure is smaller than or equal to 400 kPa.

8. A method of making a lithium secondary battery according to claim 4 or claim 6, wherein the dipping comprises:

placing the electrode active material sheet in a closed pressure vessel;

reducing a pressure in the closed pressure vessel from atmospheric pressure; and placing the electrolytic solution in the closed pressure vessel.

9. A method of making a lithium secondary battery according to one of claims 1–3, further comprising mixing a binder in step (a).

10. A method of making a lithium secondary battery according to claim 9, wherein the binder is selected from the group consisting of polyvinylidene fluoride, propylene hexafluoride, and a copolymer of polyvinylidene fluoride and propylene hexafluoride.

11. A method of making a lithium secondary battery according to one of claims 1–3, wherein the organic monomer comprises structures providing both an affinity and a lower affinity for a liquid electrolyte formed by dissolving an electrolyte salt composing the electrolyte in a plasticizer.

12. A method of making a lithium secondary battery according to one of claims 1–3, wherein the positive electrode is opposite the negative electrode through a separator composed of the solid-state or the gel-state electrolyte and the electrolyte layer.

* * * * *